Patented Sept. 19, 1944

2,358,727

UNITED STATES PATENT OFFICE 2,358,727

PLANT RESPONSE COMPOSITION

Vartkes Migrdichian, Greenwich, Conn., assignor to American Cyanamid Company, New York, N. Y., a corporation of Maine No Drawing. Application August 14, 1940, Serial No. 352,649

3 Claims. (Cl. 71—2)

The present invention relates to a composition of matter suitable for use upon more or less dilution to produce physiological response in plant tissue, and to a method of preparing the same.

It has been found that certain plant hormones and hormone-like substances may be used to induce physiological responses in plant tissue. Such a response is the production of root growth on plant stems and cuttings, slips and other plant parts. Again, it has been found that the treatment of peach trees in the state of incipient budding with such substances causes a retardation of the budding effect, which in many cases is highly desirable.

Another response which is inducible by such treatment is the lessening of the tendency for apples to drop from the tree prematurely.

It has also been found that when potatoes are sprayed with such substances, they have less of a tendency to sprout in storage than tubers not so treated.

One of the most amazing discoveries in connection with physiological response in plants is the induction of parthenocarpy. Such an effect is produced without pollination by simply spraying blossoms with one or more of these plant hormones or hormone-like substances.

Among the substances found to induce such responses are indole acetic acid, indole propionic acid, indole butryric acid, indole valeric acid, naphthalene acetic acid, phenyl acetic acid, naphthoxy acetic acids and the esters, salts and amides of these acids.

The above substances are illustrative only and are not intended to be a limitation in the practice of the present invention.

These substances are most effectively employed in the form of dilute aqueous solutions in the treatment of plants, or plant parts. Although only very dilute aqueous solutions containing about 20 parts per million or even less of the hormone or hormone-like substance are necessary to secure a desirable physiological response, these substances are so sparingly soluble in water that the preparation of even these dilute solutions is difficult. For example, when preparing aqueous solutions from some plant hormone or hormone-like substances in crystalline form, it is necessary to agitate a few milligrams thereof in a considerable volume of water for periods ranging up to several days before solution containing the substance in adequate concentration is obtained.

It has heretofore been proposed to first dissolve such substances in an alcohol and subsequently dilute the solution with water to the proper concentration. While such a procedure is generally satisfactory, yet difficulties are encountered due to the fact that the higher alcohols are not adequately miscible with or soluble in water and those lower alcohols which are sufficiently miscible with or soluble in water to obtain the desired ultimate dilution have a flash point so low that the handling of such concentrates involves a definite fire hazard. Moreover, they are particularly expensive to ship and store due to the fact that special restrictions are placed upon commodities of this character. Again, the solubilities of these tissue response substances are undesirably low in many alcohols.

It is, therefore, the principal object of the present invention to provide a solution of a plant hormone or hormone-like substance in an organic solvent, the latter being characterized by the fact that it has a flash point higher than 80° F. and is adequately miscible with or soluble in water so as to produce a homogeneous mixture therewith when used in the ultimate dilution.

A large number of organic solvents having these desirable properties are useful for this purpose. All of these substances are capable of producing a considerably higher concentration of hormone or hormone-like substance than is desirable for optimum results in plant tissue treatment. Consequently, they are capable of aqueous dilution to the necessary extent, it being only necessary to mix with a required volume of water and stir the resulting solution for a few moments.

It is obviously important that such organic solvents be inert with respect to the hormone or hormone-like substance so that reaction therewith will not occur in either the concentrated or dilute solution. Again, it is important that solutions or dilutions containing such solvents be not harmful to the plant tissue itself.

Among the organic solvents having the above properties, are the following:

2-pentanone-4-hydroxy-4-methyl
Acetonyl acetone
Diethylene glycol diethyl ether
Diethylene glycol diacetate
2-methoxy ethyl acetate
Diethylene glycol momomethyl ether acetate
Diethylene glycol monoethyl ether acetate
(2-hydroxyethyl) methyl ether
(2-hydroxyethyl) ether
(2-hydroxyethyl) isopropyl ether
(2-hydroxyethyl) butyl ether
Diethylene glycol monomethyl ether
Diethylene glycol monoethyl ether
Ethyl lactate
Isopropyl lactate Of the above compounds, the first six are preferred and the first is outstanding in desirable properties which make it particularly adapted for the purpose at hand.

While certain organic solvents have been thus specified, yet it is to be understood that these are simply illustrative of those solvents having the above properties found to be most desirable. They may be used as such or diluted with water.

In preparing a composition according to this invention, it is only necessary to dissolve the plant hormone or hormone-like substance in the solvent with or without the aid of heat. Any desired concentration of the substance in the solvent may be made such as from .5% to 10% but for commercial purposes, the higher concentrations are desirable in order to lessen the cost of shipment. The consumer simply mixes it with the requisite amount of water to secure the desirable dilution, which should ordinarily not be less than 80 parts per million.

The upper limit of concentration of hormone or hormone-like substance in the concentrated composition of the present invention will, of course, be governed by the solubility of the substance in the solvent, by the maximum amount of substance that will remain active in the composition over considerable periods of time, and by the ease with which the composition is measured for the purpose of accurately making up relatively small volumes of solution for eventual dilution. As to the lower limit, this will be governed solely by the amount of solvent employed rather than the amount of the hormone substance. In other words, while theoretically a solution of hormone in solvent might be prepared in such dilution that the hormone substance would not injure the plant tissue, yet such a concentration offers the possibility of producing detrimental results on the plant by reason of the large amount of solvent present. Consequently, it can only generally be said that the lower limits of concentration should be such that neither the hormone content nor the solvent content will cause injurious effects on the plant tissue. Ordinarily speaking, however, and inasmuch as in the vast majority of cases the concentrate will always be diluted with water, a concentrate will be produced which is capable of being diluted with water in order to produce the desired dilution. As to the final dilution, the concentration of the plant response substance in the organic solvent should, of course, be sufficiently high to permit dilution of the resulting solution with water to 100 times its original volume without reducing the concentration of the response substance to less than about 20 parts per million.

While the invention has been described with particular reference to specific embodiments, it is to be understood that it is not to be limited thereto but it is to be construed broadly and restricted solely by the scope of the appended claims.

I claim:

1. A composition of matter including a substance capable of producing a desirable physiological response in plant tissue chosen from the group consisting of indole acetic acid, indole propionic acid, indole butyric acid, indole valeric acid, naphthalene acetic acid, phenyl acetic acid, naphthoxy aetic acid and the esters, salts and amides of these acids dissolved in a solvent chosen from the group consisting of 2-pentanone-4-hydroxy-4-methyl
Acetonyl acetone
Diethylene glycol diethyl ether
Diethylene glycol diacetate
2-methoxy ethyl acetate
Diethylene glycol monomethyl ether acetate
Diethylene glycol monoethyl ether acetate
(2-hydroxyethyl) methyl ether
(2-hydroxyethyl) ether
(2-hydroxyethyl) isopropyl ether
(2-hydroxyethyl) butyl ether
Diethylene glycol monomethyl ether
Diethylene glycol monoethyl ether
Ethyl lactate
Isopropyl lactate the plant response substance being present in a concentration sufficiently high to permit dilution of the resulting solution with water to one hundred times its original volume without reducing the concentration of the response substance in solution to less than about 20 parts per million.

2. A composition of matter including a substance capable of producing a desirable physiological response in plant tissue chosen from the group consisting of indole acetic acid, indole propionic acid, indole butyric acid, indole valeric acid, naphthalene acetic acid, phenyl acetic acid, naphthoxy aetic acid and the esters, salts and amides of these acids, dissolved in 2-pentanone-4-hydroxy-4-methyl, the plant response substance being present in a concentration sufficiently high to permit dilution of the resulting solution with water to 100 times its original volume without reducing the concentration of the response substance in solution to less than about 2 parts per million.

3. A method of expediting the preparation of an aqueous solution of a substance capable of producing a desirable physiological response in plant tissue chosen from the group consisting of indole acetic acid, indole propionic acid, indole butyric acid, indole valeric acid, naphtalene acetic acid, phenyl acetic acid, naphthoxy acetic acid and the esters, salts and amides of these acids which comprises dissolving the substance in a solvent chosen from the group consisting of 2-pentanone-4-hydroxy-4-methyl
Acetonyl acetone
Diethylene glycol diethyl ether
Diethylene glycol diacetate
2-methoxy ethyl acetate
Diethylene glycol monomethyl ether acetate
Diethylene glycol monoethyl ether acetate
(2-hydroxyethyl) methyl ether
(2-hydroxyethyl) ether
(2-hydroxyethyl) isopropyl ether
(2-hydroxyethyl) butyl ether
Diethylene glycol monomethyl ether
Diethylene glycol monoethyl ether
Ethyl lactate
Isopropyl lactate in a concentration sufficiently high to permit dilution of the resulting solution with water to one hundred times its original volume without reducing the concentration of the response substance in solution to less than about 20 parts per million, and producing a homogeneous dilution thereof by mixing the resultant solution with water.

VARTKES MIGRDICHIAN.